United States Patent

Berger et al.

[11] Patent Number: 5,395,584
[45] Date of Patent: Mar. 7, 1995

[54] NICKEL-BASE SUPERALLOY COMPOSITIONS

[75] Inventors: Charles Berger, New City, N.Y.; Michael Iovene, Orange, Conn.

[73] Assignee: Avco Corporation, Providence, R.I.

[21] Appl. No.: 899,746

[22] Filed: Jun. 17, 1992

[51] Int. Cl.$^6$ ............................................. C22C 19/05
[52] U.S. Cl. .................................. 420/443; 228/262.3; 428/680
[58] Field of Search .................... 148/410, 428, 404; 428/680; 420/443, 448, 445; 228/262.3, 262.31

[56] References Cited

U.S. PATENT DOCUMENTS

| | | | |
|---|---|---|---|
| 4,388,124 | 6/1983 | Henry | 148/410 |
| 5,068,084 | 11/1991 | Cetel et al. | 420/443 |
| 5,077,141 | 12/1991 | Naik et al. | 420/488 |
| 5,154,884 | 1/1992 | Wukusick et al. | 420/448 |

FOREIGN PATENT DOCUMENTS 0532150 3/1993 European Pat. Off. .

*Primary Examiner*—Richard O. Dean
*Assistant Examiner*—Margery S. Phipps
*Attorney, Agent, or Firm*—Perman & Green

[57] ABSTRACT

Nickel-base superalloy composition for the repair, coating or rebuilding of the surface of a superalloy substrate, such as a single crystal nickel-base superalloy, to impart thereto surface areas having improved high temperature properties such as hot corrosion resistance. The present compositions are applied by low heat-input welding processes, such as laser welding or plasma arc welding, and are formulated to provide hot corrosion resistance properties and yet to have good weldability properties. The composition contains, by weight percentages, 2-12.5 Cr, 6-17 Cr, 0.5-7 Mo, 0.5-4 Ta, 2.5-9.5 Al, 1-4 Re, 1.5-8.5 W, 0.01-2.5 Nb, 0.5-6 Ti, 0.01-0.7 Yt, 0.02-3.5 Hf, and balance Ni.

4 Claims, No Drawings

NICKEL-BASE SUPERALLOY COMPOSITIONS

BACKGROUND OF THE INVENTION

Single crystal nickel-based superalloy casting compositions have been developed for their excellent high-temperature creep strength properties as required for the casting of high performance jet engine components such as turbine blades and/or for the fabrication of other metallic components which require high strength properties during prolonged and/or repeated use at very high temperatures. Reference is made to U.S. Pat. Nos. 4,885,216 and 4,677,035 for their disclosure of such single crystal nickel base superalloys.

While such single crystal superalloys represent a substantial improvement over prior known nickel base superalloys with respect to creep strength properties at high temperatures, they represent a compromise with respect to environmental attack during use, particularly due to hot corrosion caused by oxidation and/or sulfidation. Also, while such single crystal superalloy cast components such as turbine blades or shrouds have excellent high temperature strength they nevertheless are susceptible to erosion, rub damage, cracking and other damage during use, so as to require repair periodically, such as filling of cracks or surface wounds and build up or restoration of blade edges or blade tips.

DISCUSSION OF THE PRIOR ART

It is known to improve the hot corrosion-resistance of single crystal nickel base superalloys by the inclusion of additives such as yttrium, rhenium, vanadium, niobium, lanthanum and/or manganese, as disclosed in U.S. Pat. Nos. 4,885,216 and 5,077,141. However, such superalloys still undergo hot corrosion and oxidation during use.

Also there is a need for repair compositions and coatings for protecting, repairing and/or restoring nickel base superalloy substrates of all types such as turbine blades and shrouds whether based upon single crystal superalloys or other nickel base superalloys, including protective coatings for original equipment parts.

It is known to coat, fill and/or restore nickel base superalloy components such as turbine blades by welding or brazing processes, employing nickel base superalloy powders or powder mixtures which melt at a temperature lower than the melting temperature of the substrate in order to prevent damage to the substrate due to thermal cracking. Thus, repair powder compositions have been formulated to include substantial amounts of aluminum and melting point depressants, principally silicon and boron, so that the nickel superalloy filler compositions have melting points lower than the base superalloy and can be applied at temperatures which are not sufficiently high to melt the areas of the base superalloy being repaired and produce thermal cracking thereof. Reference is made to U.S. Pat. Nos. 4,008,844; 4,285,459; 4,444,353 and 4,910,098 for their disclosure of nickel superalloy brazing or welding compositions for filling and/or repairing nickel superalloy base materials such as gas turbine blades.

While the formulation of the nickel superalloy repair compositions to include excess aluminum and melting point depressants does produce the desired result of enabling the repair process to be conducted at temperatures below the melting point of the base superalloy, thereby avoiding thermal cracking of the base superalloy, the lower melting surfacing alloy represents a compromise since the filled, coated or rebuilt surface areas of the base superalloy are not integral and do not have strength or environmental properties as good as the base superalloy or meeting the original specification requirements for the base superalloy. The inclusion of melting point depressants substantially reduces the oxidation resistance of the nickel superalloy and also reduces the resistance thereof to erosion, corrosion and rub. Thus, repaired nickel superalloy parts are not as durable and are more prone to failure during use than are original nickel superalloy parts.

It is also known to weld, fill or coat superalloy substrates such as turbine airfoils or blades by low heat-input processes such as laser welding techniques, using welding or brazing powders which have substantially the same alloy composition and melting temperature as the substrate. This is made possible by the rapid and brief localized heating and melting produced by a laser beam whereby the low heat input does not induce cracking of the substrate. The result is an integral weld, fill or coating of the same composition as the substrate and having the same properties as the substrate with respect to limited high temperature resistance to erosion, corrosion and oxidation during use. Single crystal turbine blades or airfoils experience significant wear at the tip regions during typical engine operation due to oxidation, corrosion, erosion and rub associated with tight shroud clearance. Thus, it is advantageous to be able to repair and restore such blades and airfoils while, at the same time, providing repaired or restored areas having better resistance to erosion, corrosion, oxidation and/or rub than the base superalloy.

Reference is made to the following U.S. Patents for their disclosure of laser welding powders, methods and apparatuses: U.S. Pat. Nos. 4,219,592; 4,269,868; 4,300,474; 4,323,756; 4,730,093 and 4,804,815. The disclosure of the latter patent is hereby incorporated herein by reference as an illustration of a laser welding apparatus suitable for use according to the present invention.

SUMMARY OF THE INVENTION

The present invention relates to a high melting point nickel-base superalloy composition such as a repair, restoring, surfacing or coating composition which is formulated for high temperature strength, oxidation-, erosion- and corrosion-resistance and weldability by means of low heat-input welding techniques such as laser welding or microplasma-transferred-arc welding, and to the welding process for applying and integrating said composition with a nickel superalloy base material using minimum localized heat input and rapid cooling of the base superalloy in order to avoid any possibility of thermal cracking of either the base superalloy or the applied superalloy.

The laser welding process, which is preferred, involves scanning the surface of the base superalloy being filled, coated or built-up, with a localized laser beam to form a molten pool of the base superalloy surface in the presence of the nickel base superalloy in powder form to cause the nickel base superalloy powder to be co-melted and integrated into the molten pool areas of the surface of the substrate, the movement of the laser beam to adjacent areas of the base superalloy causing the molten pool containing the co-melted alloy powder to quickly resolidify as a fused, integrated combined nickel superalloy fill, coating or built-up restoration such as a blade tip. The laser beam is focused and moved in order to melt only localized surface areas of the base superalloy to form molten pool areas to which the repair powder is simultaneously applied for melting therein, and the continuous scanning movement of the laser beam over the surface area of the base superalloy causing the molten pool areas to resolidify rapidly before the heat thereof can penetrate substantially below the surface areas. In areas of the base superalloy requiring greater depths or thicknesses of the repair superalloy, such as blade tip restorations, the areas being repaired or restored are re-scanned as often as necessary, with deposit of additional repair powder, to form pool areas in the previously-treated blade tip locations into which the additional repair powder can be melted and integrated until the required thickness is accumulated.

DETAILED DESCRIPTION OF THE INVENTION

The novel nickel base superalloy compositions useful in the present laser welding process are NiCoCrAl alloys containing Mo, Ta, W, Hf, Re, Nb and Ti, optional minor amounts of Yb, C, B, Zr, Si, and trace amounts of impurities such as P, S, N, H and 0, the content of Si being no greater than about 0.5 % wt, the content of B being no greater than about 0.04 % wt and the content of C being no greater than about 0.01 % wt.

The following table illustrates the ingredients of the present repair alloys and their effective ranges:

|     | Broad Wt % | Preferred Wt % |     | Broad Wt % | Preferred Wt % |
| --- | --- | --- | --- | --- | --- |
| Ni- | bal       | bal.     | B-  | 0–0.04     | 0–0.005    |
| Co- | 2.5–12.5  | 3.0–7.5  | Hf- | 0.02–3.5   | 0.5–2.0    |
| Cr- | 6.0–17.0  | 6.0–10.0 | Si- | 0–0.5      | 0–0.3      |
| Mo- | 0.5–7.0   | 0.5–4    | Yb- | 0.–1.0     | 0.01–0.7   |
| Ta- | 0.5–4.0   | 0.5–2.5  | Re- | 1.0–4.0    | 2.5–3.5    |
| Al- | 2.5–9.5   | 3.0–6.0  | Zr- | 0–0.002    | 0–0.0015   |
| C-  | 0–0.010   | 0–0.003  | Ti- | 0.5–6.0    | 0.8–2.5    |
| W-  | 1.5–8.5   | 1.6–2.5  | Nb- | 0.01–2.5   | 1.0–2.0    |

The present alloys produced from the above compositions maybe reduced to powder form by conventional powder process methods, such as gas atomization from ingots thereof, and are made to a mesh size compatible with the applicable welding process. A preferred powder size for laser welding is one which passes a 270 mesh screen but not a 325 mesh screen.

The present compositions were developed for compatibility with low heat input welding processes and to have better high temperature corrosion-resistance properties than the substrate, particularly with respect to oxidation-resistance. Oxidation resistance and weldability are conflicting properties which require some degree of compromise in the formulation. High amounts of silicon and aluminum are detrimental to weldability but generally enhance oxidation resistance. The present compositions contain 2.5 to 9.5 % wt aluminum and no more than 0.5 % wt silicon to provide good oxidation resistance and weldability properties. Also improved weldability and high temperature strength properties are provided by the incorporation of tantalum plus niobium to form a gamma double prime phase. In addition, other components and their relative proportions are essential to provide the novel low heat input welding compositions of the present invention which differ from the compositions of the superalloy substrates to which they are applied, in order to provide improved hot corrosion resistance properties, and which have melting points above about 2400° F. and up to about 2500° F. so as to be co-meltable with the substrate at the localized temperatures produced by the laser or by microplasma-transferred arc during the welding or coating process. This is only possible because of the correlation of the present compositions and the nature of the welding process which produces a low, brief and localized heat input, restricted to surface areas of the superalloy substrate which come with the applied alloy composition and quickly cool and resolidify as integral repaired or coated areas which are substantially undetectable relative to adjacent unrepaired or uncoated areas of the substrate and which have superior high temperature properties of resistance to environmental attack during use.

The novel process of the present invention involves the steps of (a) degreasing and/or otherwise cleaning the surface of the base superalloy to be repaired, reformed and/or coated; (b) grinding the surface, if necessary, to remove oxidized or corroded surface deposits; (c) inspecting the substrate for cracks, holes, erosions or rub areas; (d) masking the surface areas of the substrate which are not being treated; (e) applying an aluminide coating strip such as to the top portion of a turbine blade or airfoil being repaired; (f) cleaning; (g) inspecting; (h) subjecting the substrate to the welding step; (i) heat-treating; (j) recoating the treated area of the substrate, such as blade tip areas, with aluminide such as Sermalloy J; (k) post-welding the treated substrate to blueprint dimensions, and (1) finally inspecting the repaired or coated substrate for imperfections. In more simplified language, the present process includes the essential steps of preparing the superalloy substrate to remove surface impurities, if present; applying the low heat input and powder to localized surface areas being repaired or coated, while moving the laser and/or the substrate to limit the duration of the comelt in each localized area, and machining the repaired or coated substrate to blueprint specifications.

The present invention is applicable to the repair, restoration, surfacing or coating of high melting point superalloy substrates, preferably single crystal superalloy substrates, having melting points higher than about 2100° F. and preferably higher than about 2350° F. A representative list of suitable commercially-available superalloy substrates and their compositions can be found at page 106 of the mid-June 1978 issue of the Metal Progress Databook. A preferred class of single crystal nickel base superalloys is disclosed in U.S. Pat. No. 4,677,035.

To practice the present invention, a variety of specimens are selected, including Alloy A of U.S. Pat. No. 4,677,035, to evaluate the effect of a laser beam in melting powder to be consolidated with a nickel base superalloy substrate. The object of such consolidation and rebuilding, sometimes called a "Reverse Machining" method, is to provide a repair layer or protective layer of a material different from that from which the article was made, while minimizing the heat affected zone. In general, the heat affected zone is that portion of the substrate which has experienced relatively high localized heat input, for example as in brazing, welding, and other types of processes, including repair processes, in which localized low input heat energy is applied to a material surface. Unless the application of heat is localized, brief and of low input, the mechanical properties of the material can be significantly reduced, sometimes to the point at which the article is no longer suitable for its intended purpose without some subsequent re-strengthening procedure. Because of the complexity of an article such as a compressor rotor portion, it is not economically attractive to restrengthen the member after a repair process which generates an inordinately large heat affected zone, particularly in such a highly stressed member.

During the evaluation of the present invention, substrate coupons are used. Test repair layers of approximately 1.5 inches in length, are deposited along the top surface of the specimen using a laser apparatus as disclosed in U.S. Pat. No. 4,804,815. In one series of tests, metal powder and the laser beam spot are applied along the test surface; the central axis of the laser beam spot being inwardly from the edge of the substrate.

In these evaluations, the powder feed rate may be in the range of about 6-24 grams per minute, within the broad range of 1-50 grams per minute according to the present invention, concurrently with the application of a laser beam maintained at a power setting of 1-5 kilowatts. The beam spot size is in the range of 0.05-0.15 inches. In these examples, a molten interaction zone is created from the metal powder and the metallic material of the coupon described above. The coupons are made from Alloy A of U.S. Pat. No. 4,677,035 and the specific powder applied thereto has a composition as disclosed below:

| Ingredients | Parts By Weight |
|---|---|
| Cobalt | 5.0 |
| Chromium | 8.0 |
| Molybdenum | 1.0 |
| Tantalum | 1.5 |
| Aluminum | 4.0 |
| Carbon | 0.002 |
| Tungsten | 2.0 |
| Boron | 0.003 |
| Zirconium | 0.001 |
| Hafnium | 1.0 |
| Silicon | 0.3 |
| Rhenium | 3.0 |
| Ytterbium | 0.5 |
| Niobium | 1.5 |
| Titanium | 1.8 |
| Nickel | balance |

While the present nickel base superalloy powder compositions were developed primarily for the repair, reconstruction and/or surfacing of nickel base single crystal superalloy substrates by means of laser welding techniques it should be understood that the present powders are also useful for the repair, rebuilding and/or surfacing of other nickel base superalloy substrates or components, where high thermal strength and hot corrosion resistance properties are required, including the application of protective coatings to original equipment components or parts thereof. Also the present powder compositions may be applied by low heat input processes in addition to laser welding, such as plasma processes and other known processes. It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A nickel base superalloy powder composition suitable for application to a superalloy substrate to produce surface areas thereon having high temperature creep strength and hot corrosion resistance, said composition consisting essentially of the following ingredients and weight percentages:

| | |
|---|---|
| Cobalt | 3.0–7.5 |
| Chromium | 6.0–10.0 |
| Molybdenum | 0.5–4.0 |
| Tantalum | 0.5–2.5 |
| Aluminum | 3.0–6.0 |
| Rhenium | 2.5–3.5 |
| Tungsten | 1.6–2.5 |
| Niobium | 1.0–2.0 |
| Titanium | 0.8–2.5 |
| Ytterbium | 0.01–0.7 |
| Hafnium | 0.5–2.0 |
| Boron | 0–0.04 |
| Carbon | 0–0.003 |
| Zirconium | 0–0.0015 |
| Silicon | 0–0.3 |
| Nickel | balance |

2. A nickel base superalloy powder composition according to claim 1 consisting essentially of the following ingredients and approximate weight percentages:

| | |
|---|---|
| Cobalt | 5.0 |
| Chromium | 8.0 |
| Molybdenum | 1.0 |
| Tantalum | 1.5 |
| Aluminum | 4.0 |
| Rhenium | 3.0 |
| Tungsten | 2.0 |
| Niobium | 1.5 |
| Titanium | 1.8 |
| Ytterbium | 0.5 |
| Hafnium | 1.0 |
| Boron | 0.003 |
| Carbon | 0.002 |
| Zirconium | 0.001 |
| Silicon | 0.3 |
| Nickel | balance |

3. A composition according to claim 1 in the form of a powder having a particle size which passes a 270 mesh screen but not a 325 mesh screen.

4. A composition according to claim 1 having a melting point between about 2100° F. and 2500° F.

* * * * *